C. H. WILLCOX & J. E. A. GIBBS.
Sewing Machine.

No. 239,998. Patented April 12, 1881.

Witnesses:
E. E. Masson
Philip Mauro

Inventors:
Charles H. Willcox &
James E. A. Gibbs by
A. Pollok their atty

C. H. WILLCOX & J. E. A. GIBBS.
Sewing Machine.

No. 239,998. Patented April 12, 1881.

Witnesses:
E. E. Masson
Philip Mauro

Inventors:
Charles H. Willcox and James
E. A. Gibbs by
A. Pollok their atty

C. H. WILLCOX & J. E. A. GIBBS.
Sewing Machine.

No. 239,998. Patented April 12, 1881.

Witnesses:
E. E. Masson.
Philip Mauro

Inventors:
Charles H. Willcox
James E. A. Gibbs
by A. Pollok
their attorney.

N. PETERS, PHOTO-LITHOGRAPHER, WASHINGTON, D. C.

C. H. WILLCOX & J. E. A. GIBBS.
Sewing Machine.

No. 239,998. Patented April 12, 1881.

UNITED STATES PATENT OFFICE.

CHARLES H. WILLCOX, OF NEW YORK, N. Y., AND JAMES E. A. GIBBS, OF ROCKBRIDGE COUNTY, VIRGINIA.

SEWING-MACHINE.

SPECIFICATION forming part of Letters Patent No. 239,998, dated April 12, 1881.

Application filed February 4, 1880.

*To all whom it may concern:*

Be it known that we, CHARLES HENRY WILLCOX, of the city, county, and State of New York, and JAMES EDWARD ALLEN GIBBS, of the county of Rockbridge, in the State of Virginia, have invented new and useful Improvements in Sewing-Machines, which improvements are fully set forth in the following specification.

This invention relates more particularly to the class of machines which produce a lock-stitch by means of a rotary hook carrying the loop of an upper thread around the mass of the lower thread contained in a stationary, or comparatively stationary, bobbin-case, and completes each stitch separately by means of an independent take-up; and the object of the invention is, generally, to increase the regularity and rapidity of movement and the efficiency in operation in the production of the stitches with precision and certainty, and with little friction or strain upon the thread, except that resulting from the tension, and, in fine, to attain as near as possible the results in which, by universal acknowledgment, the perfection of sewing-machines consists. The following special improvements may, however, be here more particularly set forth.

First, in carrying the loop over the bobbin in machines heretofore constructed the thread is subjected to more or less friction against or between the bobbin or its case and the rotary hook and the slide-ring or other device employed to hold the bobbin in position in the rotary hook. In this invention a practically free path is secured over and around the bobbin-case, and the thread is carried over the sides of the bobbin and case substantially without friction.

Secondly, friction of the bobbin-case with the hook is also practically avoided. When the bobbin-case rests or bears against the hook it not only retards the machine, but the surfaces in contact are roughened or become worn, and oil is required for lubrication, which soils the thread. In the present invention the bobbin-case is hung or suspended, like a pendulum, from a stationary point, so as to be clear of the hook. Means for suspending a bobbin-case have been employed in rotary-hook machines in making a lock-stitch, in which each stitch is drawn up by the action of the rotary hook in taking down the needle-loop to form the next stitch; but never, so far as we are aware, have they been used in combination with an independent take-up and other elements of a machine completing each stitch separately. Furthermore, in the present invention the bobbin-case is held upon the stationary point or hanger by the hook itself, instead of by means of a stationary finger or a supplementary plate, as in the machines referred to, and important advantages in avoiding strain upon the thread of the needle-loop are thus secured.

Thirdly, with the rotary hooks heretofore generally known and used the needle-loop passing over the bobbin-case places itself diagonally on the point of the hook. In this invention the loop is held squarely across the point—*i. e.*, parallel with the axis of the hook—and is, when carried over the bobbin-case, straight on both sides thereof in such a way as to require the least possible thread for the loop, according to the size of the bobbin-case used.

Fourthly, in order to give a free path over the bobbin-case it is necessary to hold the bobbin in the case. In this invention a split ring is contained in an annular recess in the barrel of the bobbin, which clasps a spindle in the bobbin-case and retains the bobbin within the case, while allowing it to turn freely.

Fifth, in this invention the movements are all, so far as possible, continuous, rotary, positive, and regular. The speed at which machines can be driven is very much limited by reciprocating parts, and especially those whose movements are irregular. The movement of the upper or loop thread in the formation of the stitch is irregular, and it is necessary that the take-up should take up and give out the thread accordingly. This effect has been generally produced by levers or devices operated by cams, although apparatus of various constructions having a rotary or combined rotary and reciprocating motion have been devised. In this invention the irregularity of action is secured with a perfectly regular rotary motion. The feed movement is positive in all directions, and takes place in an elliptical path, the horizontal axis of which is longer or shorter, according to the length of the stitch. Motion is communicated to the needle-bar through a pitman from a plane crank on the main shaft, which rotates in the goose-neck or arm of the machine.

Sixthly, in order to run at great speeds it is desirable that the reciprocating or rotary parts should be small and light, and that all movements should be made as short as possible. By making the parts small and light the friction and power are much lessened, and the same may be said of shortening the movements of the several parts. If a loop greater than is absolutely necessary is taken down by the hook the action of the take-up, and consequently its size and rapidity of movement, must be increased, and also the rate at which the thread is drawn through the cloth and the eye of the needle. Moreover, the same thread has to be worked over and over more often in sewing the same length of fabric. In this machine the shortest loop consistent with the size of the bobbin inclosed is taken down, the bobbin being capable of holding about eighty yards of No. 80 cotton, and the thread required to form the loop two and seven-eighths inches. This result is secured by placing the bobbin in its case slightly eccentric, so that a beveled surface can be made upon the bobbin-case at the proper point to assist in spreading the loop over and to the back of it, and still allow the smallest possible diameter of hook that will encircle the bobbin and bobbin-case, by placing the hook so that its point will revolve as near to the cloth as possible and permit a proper loop to be thrown by the needle, and by carrying the loop when passing under the bobbin-case square across and in the most direct line from and to the cloth. In this invention, also, the feed-eccentric is small, and the throw of the needle and the size of the take-up are reduced so far as consistent with efficient operation.

Seventhly, in this invention the upper thread is kept out of possible contact with the needle-bar, so that the soiling of it by the oil with which the needle-bar in machines using a straight needle is covered is avoided.

Eighthly, in sewing at high speed it was found that the thread was liable to be divided or stranded or to break, for some unexplained reason. We have discovered that this result is caused by the impaling of the thread upon the point of the needle from the momentum due to the upward movement of the thread under the action of the take-up, and we have therefore provided a shield or finger, which automatically interposes itself at the beginning of this movement, and protects the thread by keeping it off the point of the needle.

Ninthly, to place and secure the bobbin and case in the rotary hook or to remove it therefrom in machines heretofore devised is a matter of more or less difficulty. We have provided a hinged bobbin-holder, on the face of which the bobbin-case is hung and rests, and by turning this holder into an upright position the bobbin is inserted in its proper position in the hook, and when the holder is allowed to drop on its hinge it carries the bobbin and case out of and clear of the hook, so that they may be readily removed.

Tenthly, the needle, in descending, passes in front of the bobbin and case, and to place the latter in the hook at such times or to take it out would be impossible without bending or breaking the needle. Devices are, therefore, in this invention, provided to automatically lock the bobbin-holder to prevent it from being moved into or out of position, except when the needle is clear of the hook.

Eleventhly, the take-up is formed of two disks or plates, between which the thread is inclosed and protected, and there are, in operation, no projecting or exposed parts liable to interfere with the free movements of the operator or to be accidentally broken.

Twelfthly, the adjustment of the tension on the under thread has heretofore been effected, but inconveniently, by devices placed upon the bobbin-case. The removal of the case has usually been necessary for the purpose. In this invention the tension plate or washer is placed upon the bobbin-case, and its adjustment is effected readily and without removal of the bobbin-case from the hook. Moreover, the adjustment can be effected without removal of a slide or other part of the cloth-plate, a hole being made in the plate, so that a finger of the operator can be introduced through it to operate said device.

Thirteenthly, in order to prevent the breaking of the needles or accidental injury to the hook or other part of the machine by the striking of the point of the hook against or passing on the wrong side of the needle, the bobbin-case is provided with a vertical hole, into which the needle enters, and which thus guides the needle, and, in connection with the needle-hole in the throat-plate, accomplishes the result in avoiding all liability to the danger indicated.

This invention also consists in the construction, combination, and arrangement of parts, as hereinafter more fully set forth.

The invention will be understood from the following description, which will enable those skilled in the art to which it appertains to make and use the same, reference being had to the accompanying drawings, which form a part of this specification, and which represent a sewing-machine constructed in accordance with said invention.

Fig. 5ª is a view, in perspective, of a portion of the feed mechanism detached. Fig. 24$^a$ is a detail view, in section, of a portion of the take-up, showing the manner of connecting the plates.

The same letters indicate like parts where they occur.

Figure 10:
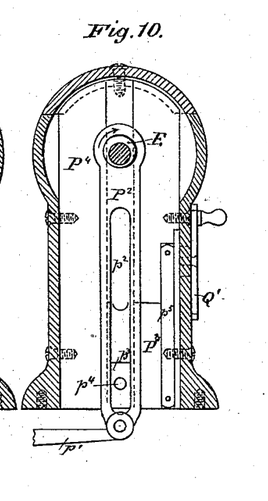
Fig. 10 a sectional elevation looking from the left end of the machine, illustrating mainly mechanism for operating the feed.

A is the main plate of the machine-frame, and B the goose-neck or stationary arm. In the latter the main shaft C turns in bearings, being driven by a belt on the pulley C' or by other suitable means. From a gear, C$^2$, on the main shaft power is conveyed to the rotary hook-shaft D by two intermediate gears, C$^3$ and C$^4$, and a pinion, D', on the shaft D, the pinion D' being half the size of the gear C$^2$, so that the shaft D is revolved at twice the speed of the main shaft. The feed is operated by an eccentric, E, (see Fig. 10,) on the main shaft.

The needle-bar F is operated through a pitman, F$^3$, by a crank, F', on the main shaft C.

The take-up H is rotary and is fixed to the outer end of the crank F'.

Figure 5:
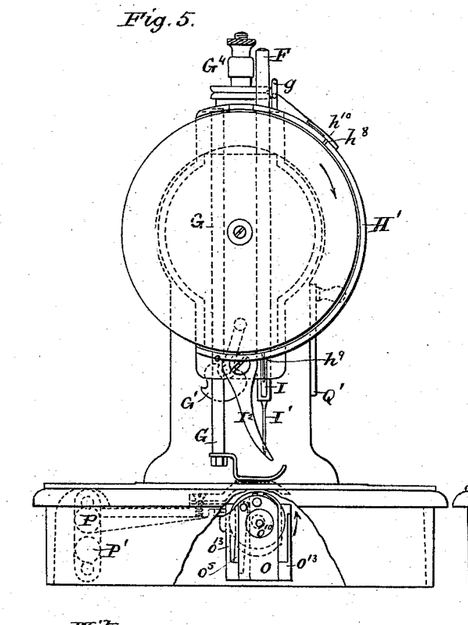
Fig. 5, an end view, looking at the head of the machine, and Fig. 6 an end view from the opposite end.
Figures 5A, 11, 12, 13:
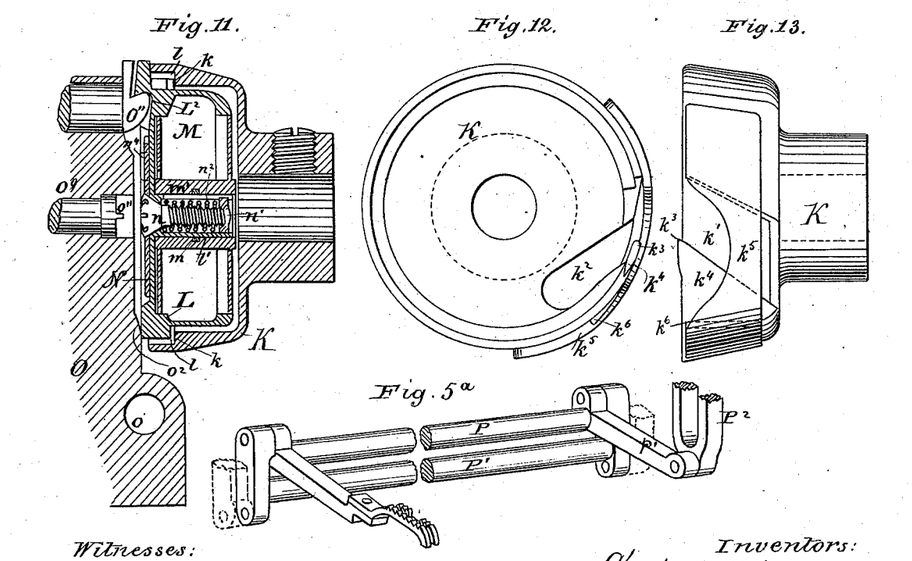
Fig. 11 is a sectional view on an enlarged scale, showing the rotary hook, bobbin, and case, and a part of the bobbin-holder, the bobbin-case being shown suspended in the hook from the hanger, the latter being fastened to the bobbin-holder.
Figs. 12 and 13 are enlarged views of the rotary hook in front and side elevation, respectively.
Figure 6:
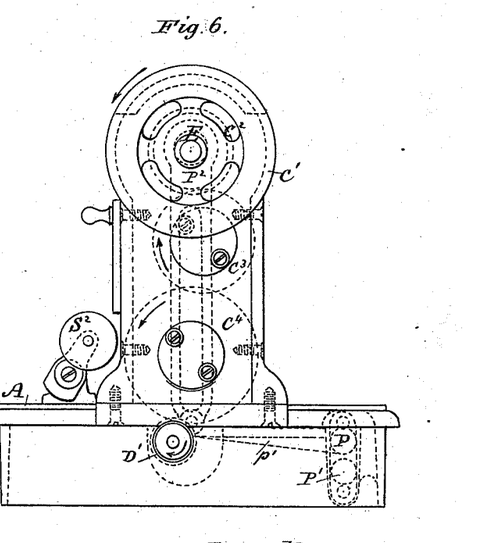

The rotary hook K is fixed upon its shaft D. It makes, therefore, two revolutions for each reciprocation of the needle. The hook (most clearly shown in Figs. 11, 12, and 13) is in its general form a cylindrical cup, having on the inside, near the front edge, a concentric shoulder, $k$. At $k'$ on the periphery and at $k^2$ at the back it is cut away, as shown, to form the point of the hook $k^4$, the extreme end $k^3$ of which extends slightly beyond the edge of the main body of the hook. The edge of the shoulder $k$, under the point $k^4$, is beveled to permit the loop when taken on the point to ride over it easily.

Across the opening $k'$ is a shield or loop-shedder, $k^5$, forming a part of the hook. This shedder is attached upon opposite sides of the opening, and on the front edge is hollowed out, as and to allow the loop to be thrown by the needle, shown, Fig. 13, to expose the point of the hook die. Above the point $k^4$ the shedder is cut away on the under side, so as to form a shoulder, $k^6$, and leave a space to receive the thread. The shoulder $k^6$ extends squarely across the hook.

Figure 16:
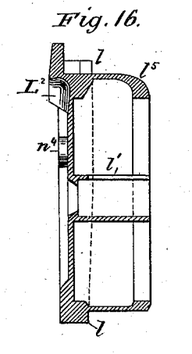
Figure 17:
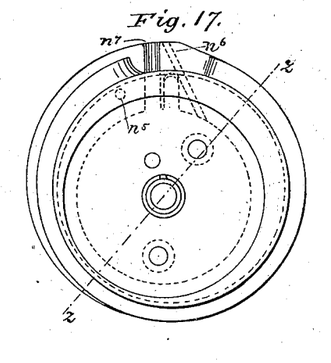

The bobbin-case L is suspended within the rotary hook by means of a hanger, O'', which projects into a recess, L$^2$, in the face of the bobbin-case near its upper edge. On the periphery of the bobbin-case a shoulder, $l$, is formed opposite the shoulder $k$ on the rotary hook. At the top a portion is cut away, leaving an open space, $l^3$. The face of the shoulder $l$ is beveled from about midway of the bobbin-case toward the bottom, as shown by the dotted line in Fig. 16, so as to leave at the bottom a small space between it and the shoulder $k$, and thus permit a slight movement of the bobbin-case into the hook.

Figure 18:
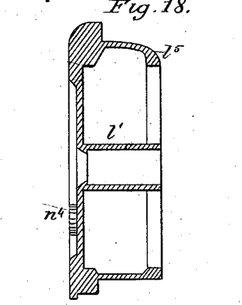
Figure 19:
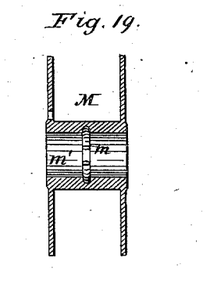
Fig. 19 is an enlarged sectional view of the bobbin, the split ring in the interior of the barrel thereof being shown in elevation.

In order to employ as small a bobbin-case as possible with the same size of bobbin the periphery of the case is turned eccentrically with reference to the opening or recess for the bobbin, so that sufficient thickness is given on one side for a bevel or incline to be made, as indicated by $l^5$, (see Figs. 14, 16, and 18,) so as to assist in carrying the loop of the needle-thread to the back of the bobbin-case. After the loop has been spread over the bobbin-case it can be carried or drawn as well over a flat as over a beveled surface, so that the shell of the case may be reduced, except at the part mentioned. For the sake of lightness, the inside of the beveled portion is cut away, as shown. The recess thus formed also allows a hole to be made outside of the diameter of the bobbin to carry the thread from the bobbin to the outside of the bobbin-case, so as to be passed through the tension and to the cloth.

The bobbin M turns upon the spindle $l'$ arranged in the center of the recess or opening within the case. It is held on the spindle by means of a split ring, $m$, sprung into an annular recess in the bore of the barrel $m'$. When the bobbin is slipped into the case the split ring clamps the spindle, and thus, while the bobbin is allowed free rotary motion by turning upon the ring $m$ in its recess, endwise movement is prevented.

Figure 20:
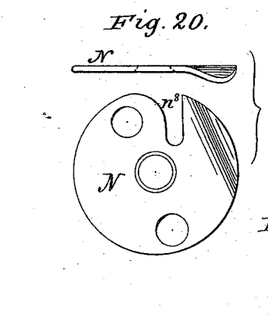
Figs. 20, 21, and 22 represent, in front and side views, and on an enlarged scale, the tension-washer of the bobbin-case, the screw for adjusting the pressure on the tension-washer, and the nut into which the screw turns, respectively.
Figure 21:
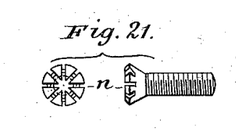
Figure 22:
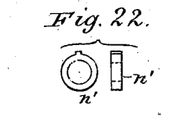
Figure 23:
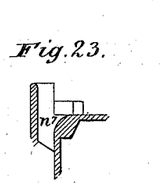
Fig. 23 shows the construction of the opening in the bobbin-case through which the needle passes, and Fig. 24 of that through which the under thread passes from the interior of the case to the tension.

In the center of the spindle is a screw, $n$, which passes through a hole in the head of the bobbin-case and screws at the opposite end into a nut, $n'$, held from turning by means of a spline working in a split or slot in the spindle $l'$. A spiral spring, $n^2$, bears one end against the head of the case and the other against the nut $n'$. The head of the screw $n$ bears against a tension plate or washer, N, fitted in a recess in the head of the bobbin-case, and the spring $n^2$, by pressure against the nut $n'$, holds said tension-plate against the head of the bobbin-case. The pressure can be regulated by turning the screw $n$, thereby compressing the spring more or less, according to the direction in which the screw is turned. The edge of the tension-plate N is turned up at one side, (see Fig. 20,) so that the thread can be readily drawn between the plate and the head of the bobbin-case. Two pins, $n^4$, Fig. 15, on the latter fit into holes in the tension-plate, and serve to prevent the turning of said tension-plate, and also to guide the thread and to equalize it on opposite sides of the screw $n$. In the upper part of the bobbin-case, Figs. 14, 15, 17, 23, 24, are a hole and slot, $n^5$, for the passage of the under thread from the bobbin to the tension, another hole and slot, $n^6$, for the passage from the tension to the cloth, and a vertical hole, $n^7$, to receive the needle. The tension-plate, Fig. 20, is slotted at $n^8$ from the top for the passage of the needle.

Figure 24:
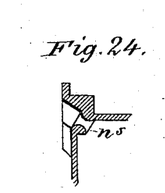
Figure 24A:
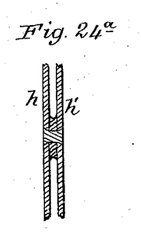

In order that the thread may not be drawn over the edge of the bobbin the inner side of the head of the bobbin-case is recessed to receive one of the side plates or flanges of the bobbin, and the hole $n^5$ enters above the edge of the recess, as shown in Fig. 24.

Figure 14:
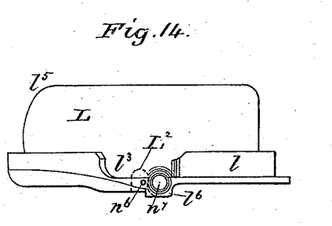
Fig. 14 is a top view, Fig. 15 a front elevation, Fig. 16 a section on line $y\ y$, Fig. 15, Fig. 17 a rear elevation, and Fig. 18 a section on line $z\ z$, Fig. 17, of the bobbin-case enlarged.
Figure 15:
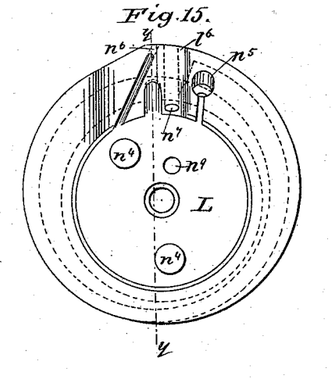

The face of the bobbin-case is formed at the top with a projection, $l^6$, Figs. 14 and 15, which prevents the turning of the bobbin-case, and in which the hole $n^7$ is made. At the bottom of the slot $n^8$ in the tension-washer, when secured on the bobbin-case, is a small hole, $n^9$, which extends through the head of the case for pushing out the bobbin by a pin or other similar instrument.

The bobbin-case is supported by a bobbin-holder, O, which is hinged at $o$ to a block, O', attached to the machine-frame and extending under the rotary hook. The block O' has two segmental or curved sides, $o^{13}$, between which the holder O moves, and which serves to retain the bobbin-case in position to guide it while being inserted into or removed from the hook. In this bobbin-holder the hanger O'' is fastened so as to project beyond its face. The lower side of the hanger is curved or beveled, and upon the top it may be inclined, as shown, or it may be level. The face of the holder O is cut away opposite the bobbin-case, except at the lower part, where a bearing, $o^2$, is left for the bobbin-case to rest against when suspended on the hanger. Near the top the surface is cut away to form a shoulder, $o^3$, between which and the side of hanger O'' the projection $l^6$ is loosely confined. The bobbin-case is prevented from turning in one direction by contact of one side of the projection $l^6$ with the shoulder $o^3$, and in the other direction by contact of the opposite side of the projection $l^6$ with the side of the hanger, sufficient space for the largest thread being allowed. Since this side, when the case is placed in position on the hanger, is adjacent to the side of the latter and extends beyond the edge of the recess $L^2$, as shown in Fig. 14, the path between the side of the hanger and that of the recess $L^2$ is always left free.

A spring-catch at the back of the holder retains it in position when turned on its hinge into the positions shown in the drawings. This catch is formed by a pivoted bar, $o^5$, against which a spring, $o^6$, placed in a hole in the holder, bears.

At the side of the bobbin-holder extends an arm, $o^7$, which has a projection, $o^8$, on its upper side near the end, the purpose and operation of which will be hereinafter explained.

In the center of the holder a short shaft, $o^9$, is placed, which is free to turn, and also to move endwise, the endwise movement, however, being limited by suitable collars or shoulders. At one end of the shaft is a milled head, $o^{10}$, and at the other a small blade, $o^{11}$, of a size to fit in the nicks which are made in the head of the bobbin-tension screw. A spring, $o^{12}$, surrounds the shaft $o^9$, and by its pressure holds the blade $o^{11}$ out of contact with the head of the screw $n$. By pressing on the head $o^{10}$ the blade $o^{11}$ is forced into a nick in the head of the screw $n$ when the bobbin-case is in position, and by turning the head the tension can be regulated without removing the bobbin from the machine. When the head is released the spring returns the screw-driver, which the shaft and its blade, in fact, form, to its first position.

In order to place the bobbin-case in position in the rotary hook it is suspended from the hanger against the face of the bobbin-holder, (this being dropped and its face being inclined,) and by raising the holder the bobbin is brought into position in the rotary hook. Suitable stops limit its movement on the hinge, which stops are, or may be, formed by elevations $x$ on one of the sides, $o^{13}$, in the path of the arm $o^7$.

Figure 8:
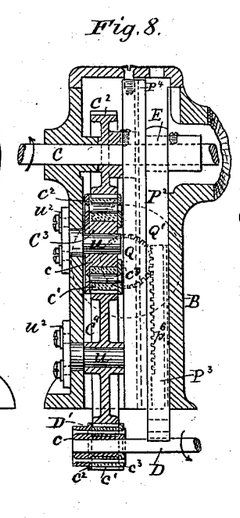
Fig. 8, a sectional elevation of the standard of the goose-neck, looking from the rear, the rotary hook-shaft and pinion being also shown.
Figure 9:
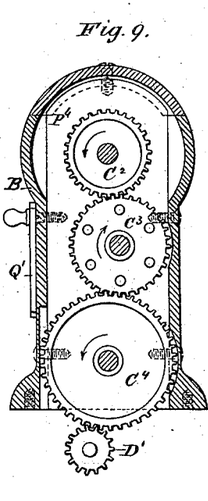
Fig. 9, a sectional elevation looking from the right end of the machine, showing, mainly, the gears for communicating motion from the main to the rotary hook-shaft.

The gearing which conveys motion from the main to the hook shaft is rendered noiseless by forming the teeth of alternate gears of leather or other deadening material, the teeth of the other gears being of metal. The intermediate gear $C^3$ and pinion D, Fig. 8, are formed of a metal boss, $c$, and a leather ring, $c'$, in which the teeth are cut, surrounding the boss and confined between a flange, $c^2$, on the boss, and a metal washer, $c^3$, by means of rivets. The leather pieces are glued together and compressed to solidify them. The washer $c^3$ is riveted on under pressure. The face of the leather gears are turned off and the teeth cut as if they were of solid metal. The width on the face of the leather ring should be slightly greater than that of the metal gears, in order that there may be no contact of metal surfaces.

In order to permit the adjustment of the gearing either in the first instance or to take up wear the pins $u$, on which the intermediate gears turn, are rendered movable by making the holes in the standards of the goose-neck through which they pass somewhat larger than the periphery of the pins, and securing them by screws passing loosely through holes in the flanges $u^2$, washers being placed under the heads of the screws.

Figure 26:
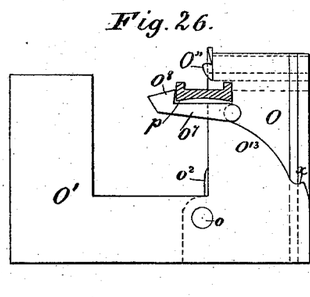
Figs. 26, 27, 28, and 29 are, respectively, a rear view, plan, end view, and front view of the bobbin-holder with the block by which it is attached to the machine-frame, the arm of the feed-bar to which the feed-surface is attached being shown in section in Fig. 26 in position for locking the holder and preventing it from being dropped on its hinge.
Figure 27:
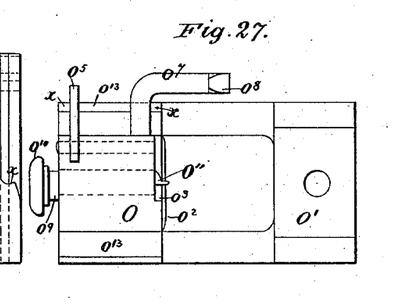
Figures 28, 29:
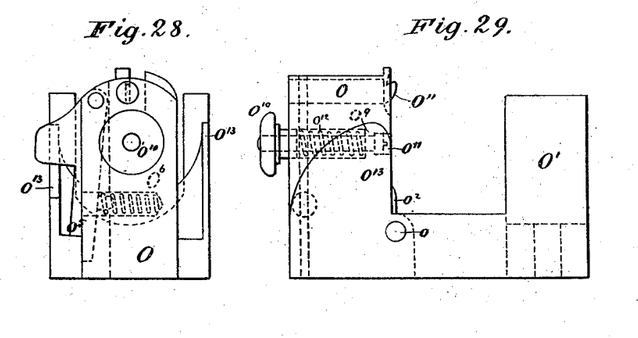

The bar P, Figs. 1, 2, 4, 5, and 6, to one arm of which the feed-surface is fastened, is pivoted at both ends to a rocker, P′, which is hinged by two pins to the machine-frame. The arm to which the feed-surface is attached has its center directly over the axis of the pin on which the bobbin-holder turns, and on the under side is hollowed out, as shown at $p$, Fig. 26, on an arc of a circle concentric with the movement of the bobbin-holder. When the feed is depressed below the throat-plate this arm is in the path of the arm $o^7$ of the bobbin-holder, or of the projection $o^8$ thereon, so that movement of the latter to open or close the bobbin-holder is prevented. When the feed is raised the path of the arm $o^7$ is clear and the bobbin-holder may be turned in or out freely. The object of hollowing the under side of the arm of the feed-bar is to secure a free passage, when passage is allowed at all, and thus prevent binding of the arm $o^7$. Since in this, as in other machines having a four-feed motion located beneath the cloth-plate the feed and needle approximately rise and fall together, the bobbin-holder will be locked when the needle is below the cloth and unlocked when it has risen clear of the hook. The other arm, $p'$, Fig. 10, of the feed-bar is jointed by means of a pin with the lower end of the slotted bar $P^2$, which, at the upper end, fits around the feed-eccentric E in the main shaft.

In the slot $p^2$ in the bar $P^2$ is a box, $p^3$, which is free to slide up and down in said slot, the box turning freely upon a fulcrum pin or stud, $p^4$, forming part of a slide, $P^3$, which is guided in its movement up and down by a tongue fitting in a groove in the center plate, $P^4$, which forms part of the machine-frame.

A bow-spring, $p^5$, secured upon the side of the slide and bearing against the inside of the goose-neck presses it against the plate $P^4$, and thus produces sufficient friction to retain the slide $P^3$ in its position on the center plate, $P^4$.

A rack, $p^6$, Fig. 8, upon the side of the slide, is engaged by a pinion, Q, journaled in the side of the upright part of the goose-neck and operated by a handle on the outside. By turning said handle the slide, and with it the fulcrum-pin $p^4$ and box $p^3$, is raised or lowered, thereby increasing or diminishing the back-and-forth movement of the lower end of the bar $P^2$, and consequently of the feed and the length of the stitch, while the up-and-down movement is constant.

It is obvious, on account of the respective lengths of the levers on each side of the fulcrum $p^4$, that when the box is near the lower end of the slot the length of feed will be short, but when near the upper part it will be long. All the movements of this feed are positive, and no retractile springs are required.

In order to furnish an exact indication of the length of stitch a plate, Q′, is attached to the shaft of the pinion Q, and the circumference of this is marked up into divisions at the required distances apart. The handle to operate the pinion Q is attached near the outer edge of this plate.

Figure 7:
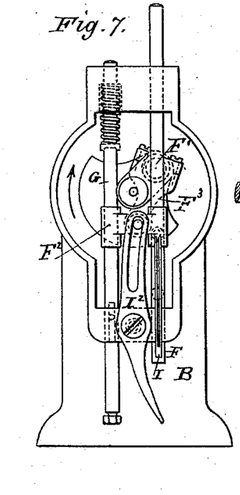
Fig. 7 is an end view of the goose-neck and head of the machine, as shown in Fig. 5, with the take-up and segments for guiding the thread thereto removed.

The needle-bar is, as already stated, operated by a crank on the main shaft. It moves in guide-holes in the head of the machine (see Figs. 3 and 7) and is connected with a cross-head, $F^2$, which is guided by the presser-bar G. To this cross-head the pitman $F^3$, connected at the lower end by a stud, conveys the movement of the crank in a vertical direction. In order to obtain a slower movement at the top of the stroke of the needle-bar, to give time for the action of the take-up, the pitman is made short relatively to the throw of the crank. The presser-bar G is free to move in guide-holes in the head of the machine, and is held down by a spring in any ordinary or suitable way. In the construction shown in the drawings one end of a spiral spring bears against a pin inserted in a hole in the bar, while its upper end presses against the head of the machine. To raise and lower the presser-bar an eccentric or cam lever, G′, is pivoted to the head of the machine and acts upon a pin fixed to the presser-bar, which pin works in a slot and serves to steady the bar.

The tension $G^4$ is of any ordinary or suitable construction. The thread is led from the spool-holder $G^5$ around the pin $g$, thence between the washers of the tension, then through the bend in the upper part of the pin $g$ to the take-up, as clearly shown in Fig. 2.

Figure 1:
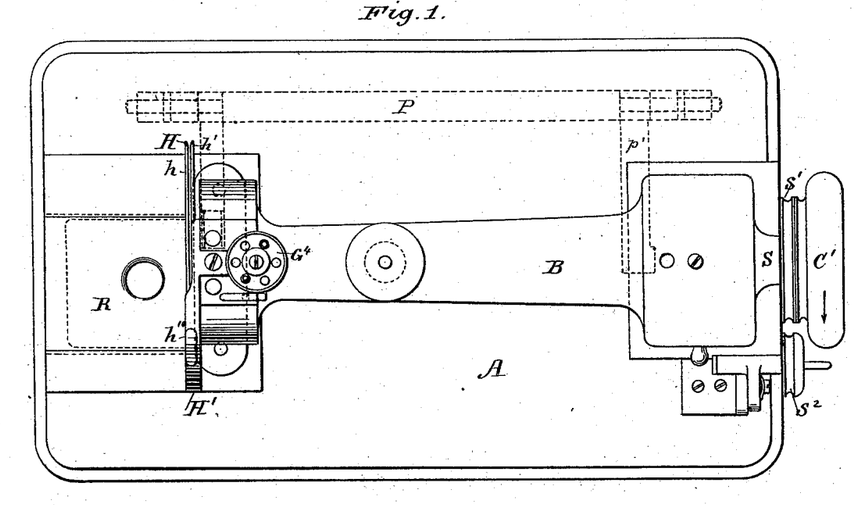
Figure 1 is a top view.
Figures 2, 3:
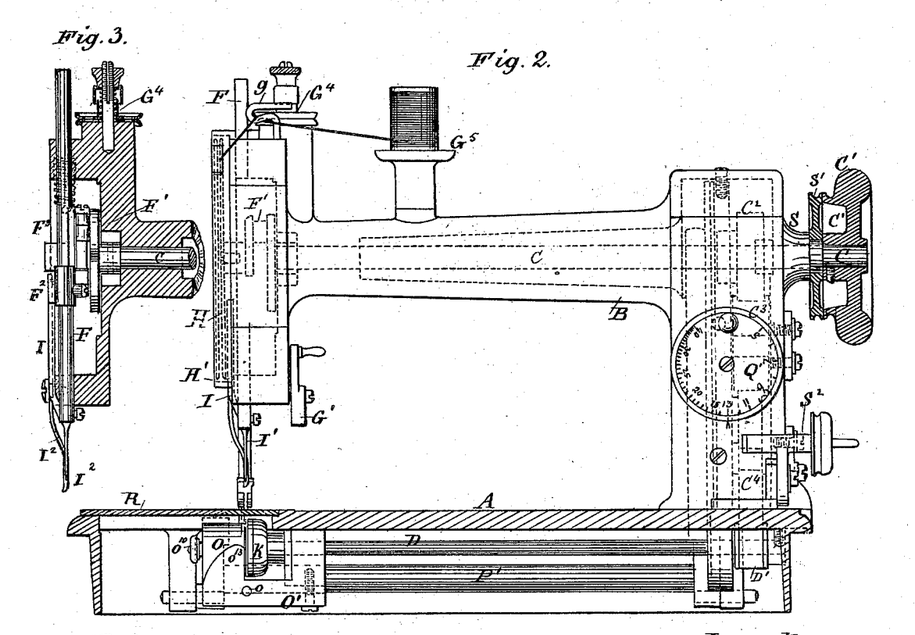
Fig. 2, a front elevation, partly in section.
Fig. 3, a sectional elevation of the head of the machine, the take-up and segment for guiding the thread thereto being removed.
Figure 4:
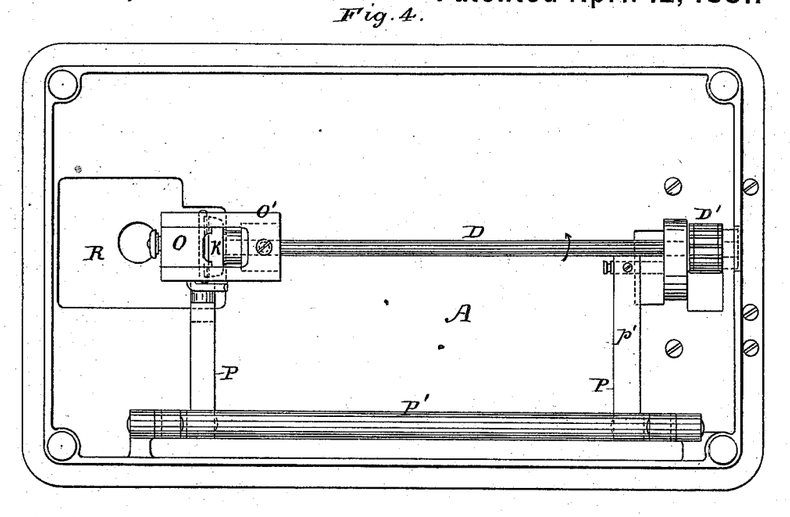
Fig. 4, a bottom view of the machine.
Figure 25:
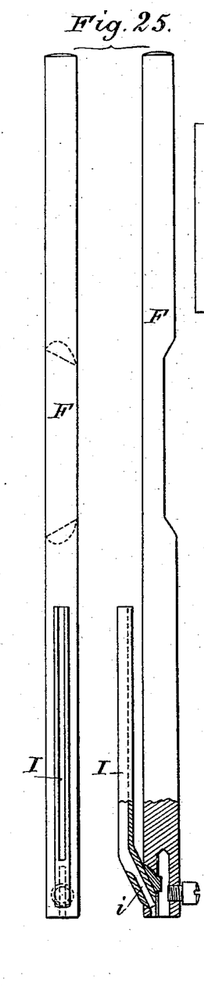
Fig. 25 shows, on an enlarged scale and in two views, the needle-bar with the thread-protector attached.
Figures 32, 33:
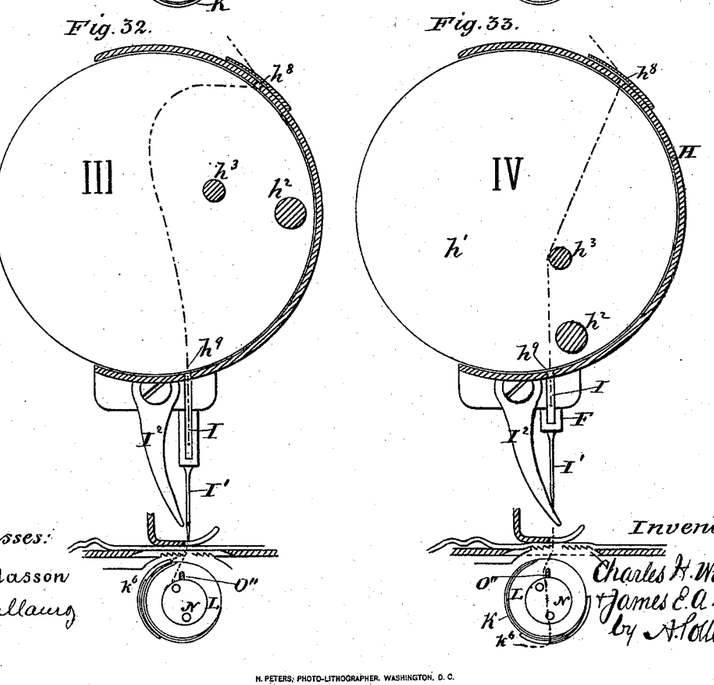
Figure 34:
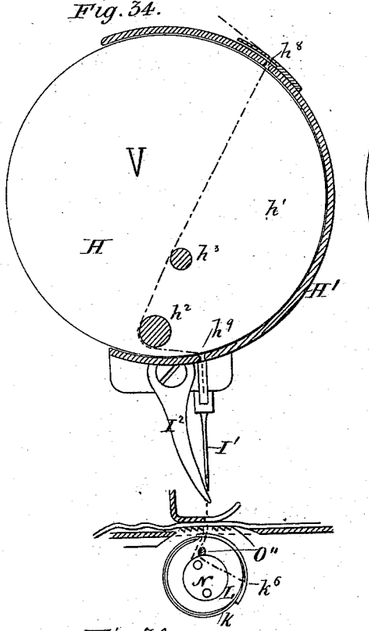

The take-up H is formed of two disks or plates, $h\ h$, Fig. 1, held about one-sixteenth of an inch apart by two washers with grooved edges, and connected by rivets passing through the plates and washers in the manner substantially as shown by the detail view, Fig. 24$^a$. For convenience these rivets and washers are generally represented as solid pins $h^2\ h^3$, Figs. 30 33, which would, in fact, answer every purpose. The take-up is fastened to the end of the main shaft by a screw which passes through the inner plate only, or by means which will leave the space between the plates at the center open for the passage of the thread. The peripheries of the plates on the side toward the operator (it may be entirely around, if desired) are covered by a segment of a ring, H', in which are slotted holes $h^8 h^9$, Figs. 5 and 30 to 37, for the passage of the thread. In order to keep the thread in the slot $h^8$, to which it is led from the pin $g$, a short plate or bar, $h^{10}$, is secured to the segment H' at one end and projects across said slot. The bar or plate should preferably be a spring, so as to bear at its free end against the upper surface of the segment H' and prevent accidental escape of the thread from the hole. From this hole $h^8$ the thread is passed to the left, Fig. 5, between the plates of the take-up into the slotted hole $h^9$. Between the hole $h^9$ and the eye of the needle a thread-protector, I, is provided, which prevents the thread from coming in contact with the needle-bar and thus becoming soiled by the oil on said bar, and which consists (see Fig. 25) of a rod or wire grooved throughout the main portion of its length and terminating at the bottom in a short inclined tube, $i$, where it is attached to the needle-bar. The tube $i$ guides the thread and delivers it close to the needle I'. The needle is grooved on the side of the thread-protector from the eye upward, and upon the opposite side from the eye downward to the point.

In order to keep the thread off the needle-point when running at high speed a thread-shield is employed, which consists of a finger, $I^2$, pivoted to the head of the machine, (see Fig. 7,) and operated by means of a pin on the cross-head $F^2$ moving in a slot in its upper end. Any suitable means might be used to impart the required movement to this finger or thread-shield. From the shape of the slot, as shown, the finger is caused to place itself under the point of the needle as it rises. On the descent of the needle the finger is gradually withdrawn. The end of the finger is turned to one side, so as to be always placed on the left side of the thread.

A suitable throat-plate with needle-hole and feed-slots is secured to the cloth-plate of the machine. A slide, R, permits access to the bobbin-holder. In this slide is a hole, into which a finger of the operator can be introduced to regulate the tension by means of the milled-headed screw-driver in the bobbin-holder.

At the back of the goose-neck or arm C, and encircling the bearing of the shaft, is an extension or boss, S, which serves as a journal for the boss-pulley S'. The band is caused to run in the pulley S' when spooling a bobbin. The spooler $S^2$ may be of any ordinary or suitable construction, and is arranged to be driven by the band of the machine when it runs upon the loose pulley S'.

The operation of the machine is as follows: The bobbin being filled and the thread passed from the inside of the bobbin-case through the hole $n^5$, the bobbin is placed in the case and the thread is then placed under the tension-plate N, around the pins $n^4$, and out through the hole $n^6$. The bobbin-holder O being open or dropped the bobbin-case is suspended on the face thereof from the hanger O'', and the holder is turned up into an upright position to introduce the bobbin into the hook, the needle being above the plate. The spring-catch retains the holder in position. The segmental sides guide the bobbin-case properly into the hook. The upper thread is led from the spool through the tension and take-up and thread-protector to and through the eye of the needle, as already stated. That the needle shall always be inserted in the needle-bar in the proper position its shank is grooved and there is a spline in the hole of the needle-bar, over which the groove fits, and the hole is of such depth that the needle may be pushed to the top. The work is then introduced, the presser-foot let down, and the machine started by turning the top of the pulley on the main shaft toward the operator. The arrows indicate the movements of the parts. The rotary hook is revolved in the opposite direction to the main shaft and at twice the speed. The needle-bar descends by the revolution of the crank F', carrying with it the thread-protector, and forces the needle through the cloth. Upon the ascent of the needle the point of the rotary hook is carried through the loop. The point spreads the loop and the loop-shedder turns over the thread leading from the cloth across the point, so that it rests in contact with the shoulder $k^6$. The continued movement of the hook carries this thread over the left of the bobbin-case, while the thread from the needle is carried over the right, the movement to the back of the case being assisted by the inclined surface $l^5$. At the time of taking the loop the point of the hook is opposite the opening in the shoulder $l$ on the bobbin-case, but by the continued revolution the point is carried past the opening, and the shoulder $k$ extends entirely across the said opening, so that the thread leading from the needle, although otherwise free, is inclosed and prevented from escaping by the close proximity of the shoulders $k$ $l$. As the loop is carried over the bottom of the bobbin-case the outer thread from the cloth strikes against the side of the hanger O'', and it then passes between the case and the bearing $o^2$ on the face of the bobbin-holder, and in doing so swings the case suspended from the hanger like a pendulum into the hook just sufficiently to allow the passage of the thread. This sidewise movement is permitted by the form of the shoulder $l$, by which a space is left at the lower part between it and the shoulder $k$. As soon as the loop has passed over the lowest part of the bobbin-case it begins to be drawn up. It is, however, held on the hook by means of the shoulders $l$ and $k$ until the point again comes opposite the opening in the shoulder $l$, when the loop is released.

The action of the hook in connection with the other parts will now be described, reference being had to Figs. 30 to 37.

Figure 30:
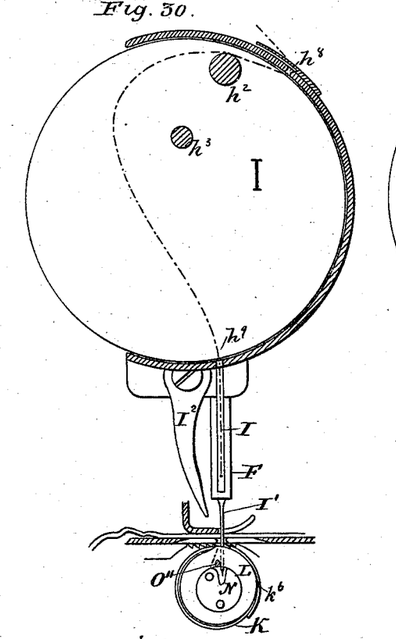
Figs. 30, 31, 32, 33, 34, 35, 36, and 37 constitute a series of diagrams illustrating the different positions occupied by the stitch-forming devices and feed-surface in the formation of each stitch.
Figure 31:
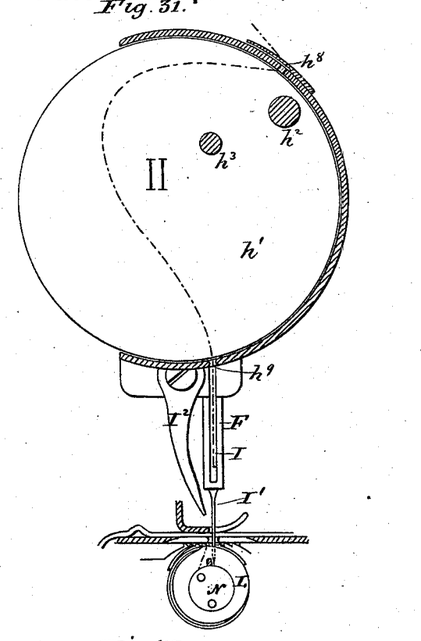
Figure 35:
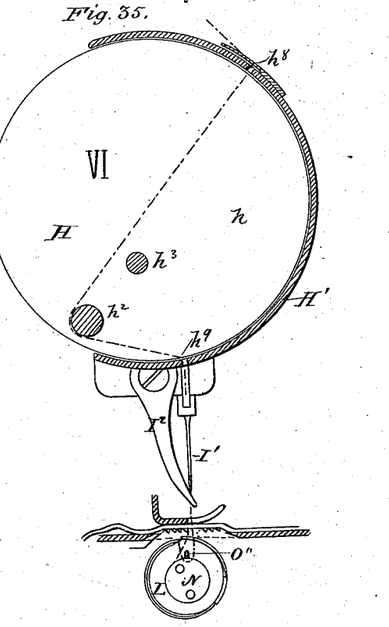
Figure 36:
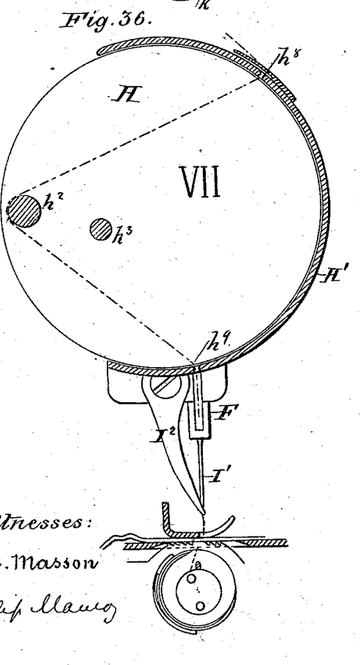
Figure 37:
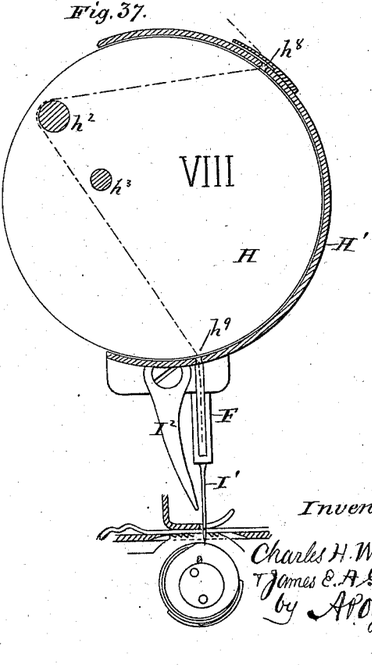

In position I, Fig. 30, the needle is at the bottom of its stroke, the thread being loose between the plates of the take-up. By the revolution of the main shaft the parts are brought into position II, Fig. 31, in which the hook has taken and spread the loop, drawing down the thread required. The take-up, in passing from position I to II, is releasing the thread. In position III the hook has completed another eighth of its revolution, the take-up continuing to give out the thread, but slowly. The finger or shield $I^2$ for the upper thread is approaching the needle. In position IV the shoulder $k^6$ of the shedder is directly under the bobbin-case, and the loop is ready to be drawn up, having been carried over the bottom of the bobbin-case. The needle is slowly rising, having almost reached the top of its stroke, the finger or thread-shield $I^2$ has interposed itself below the point of the needle at the side of the upper thread, the take-up is just coming into action to take up the thread, the pin or washer $h^3$ being brought into contact therewith, and the feed has begun to rise. In position V, Fig. 34, the needle is at the top of its stroke, the take-up has commenced its action, drawing the thread rapidly over the thread shield or finger $I^2$ and through the eye of the needle, and the feed has begun to act upon the fabric sewed. As the hook revolves the take-up continues to draw up the slack of the loop until position VI, Fig. 35, is attained, when the loop is about to be drawn between the hanger and the bobbin-case. The feed has now risen to its highest position, and has lifted and holds suspended the bobbin-case by means of the under thread, so that a free passage is made for the loop between the upper side of the hanger and the surface of the case, against which it usually rests. In this position VI the shoulders $k$ and $l$ on the rotary hook and bobbin-case no longer retain the loop on the hook, but permit it to be freely drawn around the hanger, as shown. In position VII, Fig. 36, the stitch is completed, the take-up is at its farthest limit, in reaching which it has drawn off from the spool through the tension the thread required for the stitch, the feed is passing below the surface of the throat-plate, allowing the bobbin-case to drop back on the hanger, and the thread shield or finger has withdrawn from the path of the descending needle. As the needle descends for the formation of another stitch little or no additional thread is required, the eye of the needle passing easily over the thread if held taut. At this time the pin or washer $h^2$ is swinging in the bight of the thread and gives up the thread very slowly. When, however, the parts are brought into position VIII, Fig. 37, and the eye begins to descend below the cloth, a rapid giving up of the thread is necessary, and the action of the take-up to release the thread is correspondingly rapid. The several parts are then brought again into position I, and the operations described are repeated. When the rotary hook passes from position VI to position VII, since the needle is above the cloth, it takes no loop, but makes an idle revolution, before the needle descends and throws another loop. When the take-up acts to finish the stitch the under thread is drawn off through the tension, the bobbin-case being drawn against the under periphery of the hook, which furnishes the resistance required.

The needle during the taking up of the slack has only a slight movement, as the crank $F'$ is then passing over the center at the top, and the pitman, being very short, as before mentioned, a comparative pause is produced.

The take-up motion is three-fold. From position IV to VII the thread is drawn up rapidly at first, more slowly as the stitch is completed and fresh thread is drawn from the spool. From position VII to a return to a point between positions I and II the thread is slackened slowly at first, then more rapidly, and from this point to position IV the thread is but little affected by the take-up, but is free to be drawn down as the hook requires.

It will be seen that the pin $h^3$ (or washer) nearest the center does not interfere with the taking-up action at all, but in slackening it regulates the giving up of the thread.

In order to diminish the size of the take-up and also the length of the thread necessary to be drawn up at each stitch, the take-up is arranged to draw up and give out the length of the thread required for sewing ordinary fabrics.

When very thick goods are sewed with a long stitch the length of thread required in addition to the amount furnished by the take-up is drawn from the spool through the tension by the rotary hook as the loop is carried over the bottom of the bobbin-case. The locking of the bobbin-holder by means of the arm $O^7$ and the feed is effected periodically in the manner already stated.

The object of the thread shield or finger has already been stated to be to keep the upper thread from the point of the needle. For running at ordinary speeds this device would not be necessary; but when a speed is attained of from one thousand five hundred stitches per minute upward to two thousand five hundred or over, as has been practically obtained with this machine, the shield is required to keep the thread from impaling itself on the point of the needle. At a speed of two thousand stitches per minute the thread is, in this machine, drawn through the eye of the needle at a velocity of more than one thousand seven hundred feet per minute, two and seven-eighths inches of thread being taken up at each stitch in one-third or less of the time of its formation. The momentum of even a small thread at such speeds is very great.

We have described what is regarded by us as the best manner of carrying our invention into effect. We do not, however, limit ourselves strictly thereto, for it is obvious that parts of the invention could be used without the others, and could be applied to machines of otherwise ordinary or suitable construction, and also that various modifications might be made in details. For example, the pivoted finger or shield for the upper thread could be applied to any machine.

In case the needle-bar is operated by a lever pivoted to the goose-neck or arm of the machine, the shield could be vibrated by a pin on this lever or attached to the needle-bar itself.

The hanger, instead of being inclined on the top, may be horizontal, and it will answer a good purpose so far as its operation in the hook is concerned; but by inclining the top backward, making it hook-shaped, the more certain removal of the bobbin-case from the hook is secured when the holder is dropped, and the bobbin-case is also better held out of contact with the hook.

Having thus fully described our said invention and the manner in which the same is or may be carried into effect, what we claim, and desire to secure by Letters Patent, is—

1. In a rotary-hook double-thread sewing-machine, the combination of a cup-shaped rotary hook and a bobbin-holder having a hanging piece or hanger with a bobbin-case suspended from said hanging piece or hanger within said hook and retained in position on the hanger by the hook and bobbin-holder with sufficient freedom to permit a loop of thread to be readily carried around it, substantially as described.

2. The combination, in a rotary-hook double-thread sewing-machine, of a bobbin-holder and hanger with a bobbin-case having an enlargement on the face thereof opposite the hanger, arranged above and at one side of the point of the hanger, as shown and described, so as to prevent rotation of the bobbin-case, while allowing a free passage of the thread around said point of the hanger, as set forth.

3. The combination, with a rotary-hook and stationary bobbin-hanger, of a bobbin-case provided on its face with a recess, into which the hanger projects, and a projection adapted to bear against the side of the hanger and extending beyond the side of the recess aforesaid, substantially as described.

4. The combination, with the bobbin-case, of a bobbin-hanger and a bobbin-holder, the latter recessed on its face but provided with an elevated bearing-surface at its lower part for the bobbin-case, substantially as described.

5. A cup-shaped rotary hook of internally-cylindrical form having a portion of the periphery and also of the back cut away to form the point, the extreme end of said point extending slightly beyond the edge of the main portion of the hook, substantially as described.

6. The cup-shaped internally-cylindrical rotary hook having portions of the periphery cut away from front to back to form the point, and provided near its edge with an internal concentric shoulder, the edge of said shoulder beneath the point being beveled, substantially as described.

7. The combination of a cup-shaped rotary hook having a portion of its periphery cut away to form the point, with a loop shedder or shield secured across the opening in front of the point, substantially as described.

8. A bobbin-case of general cylindrical shape open at one end and provided upon its periphery with a shoulder extending around said case, as explained, and said shoulder being cut away at the top to form an opening for the passage of the loop of the needle-thread and having its face beveled or slightly cut away toward the bottom, substantially as described.

9. A bobbin-case having on its face side, at the top, an elevation or rim in which are separate holes for the passage of the needle and for delivering the under thread to the cloth, the centers of said holes being in substantially the same plane perpendicular to the axis of the case, as described.

10. The combination, with a rotary hook, of a stationary bobbin-case having on its face side, at the top, an elevated rim extending substantially to or beyond the path of the point of said hook, and provided with separate holes or openings for the passage of the needle and delivery of the under thread to the cloth, the centers of said holes being substantially in the same plane perpendicular to the axis of the bobbin-case, as set forth.

11. The combination of a bobbin-case having a circular or annular shoulder on its periphery with a cup-shaped rotary hook having a portion of the periphery cut away from front to back to form the point, and provided with a concentric shoulder on the interior of the periphery corresponding with that on the bobbin-case, the shoulder on said case being cut away at the top, as set forth.

12. The combination of the bobbin-case having openings at or near its face side for the passage of the needle and delivery of the under thread to the cloth with a cup-shaped rotary hook and a loop shedder or shield secured across the opening in front of the point of said hook, substantially as described.

13. The combination of the loop-shedder rotary hook with concentric shoulder on its inner periphery and bobbin-case provided with an exterior shoulder, said exterior shoulder being cut away at the top to form an opening, substantially as described.

14. In combination with a bobbin-hanger and bobbin-case adapted to be suspended from said hanger and provided with an exterior circular or annular shoulder, the upper part of which is cut away, as explained, of a cup-shaped rotary hook provided with a concentric shoulder corresponding to that on the bobbin-case, substantially as described.

15. The combination, with a bobbin-hanger and rotary hook with interior concentric shoulder, of a bobbin-case suspended from said hanger and provided with an exterior shoulder corresponding with the shoulder on the hook, but beveled toward the bottom to permit the case to swing slightly into the hook, substantially as described.

16. The combination, with a bobbin-case having a spindle, of a bobbin having an annular recess in the interior of its barrel and provided with a split ring sprung into said recess and adapted to clamp the aforesaid spindle, substantially as described.

17. A sewing-machine bobbin having an annular recess in the interior of its barrel and provided with a split ring sprung into said recess, substantially as described.

18. The combination, with a bobbin-case having an opening adapted to serve as a thread-guide for delivering the under thread from a contained bobbin to the cloth, of a bobbin holder and support or hanger arranged to hold said case with the center of said opening or thread-guide in the vertical plane parallel to the feed-motion through the axis of the needle, substantially as described.

19. The combination, with a rotary hook, of a hinged bobbin-holder, and adapted to retain a bobbin-case in position on the face of said bobbin, and a bobbin-hanger attached to said holder, the axis on which the holder turns being at right angles to the axis of the hook, substantially as described.

20. The combination, with a rotary hook, of a bobbin-holder hinged to turn on a horizontal axis, means, as indicated, for supporting a bobbin-case in position on the face of the holder, and stops to limit the movements of said holder, the stop which limits the outward movement away from the hook being arranged to bring the holder to rest with the face thereof in an inclined position, substantially as described.

21. The combination, with a hinged bobbin-holder, of segmental or curved side pieces for retaining the bobbin-case in position when placed on the face of said holder and for guiding it into the hook, substantially as described.

22. A bobbin-holder and means for supporting the same, in combination with a locking-arm adapted to be engaged by the feed in its descent, substantially as described.

23. The combination, with a bobbin-case having a recess and projecting pins on the head thereof, of a tension-washer having openings therein inserted in said recess with the aforesaid pins fitting in said openings, substantially as described.

24. A tension-washer for the bobbin composed of a flat disk, turned up at one edge, slotted from the top downward for the passage of the needle, and provided with openings for attachment to the head of the bobbin-case, substantially as described.

25. The combination of the bobbin-case having a central spindle, a tension washer or plate fitted in a recess in the head of the case, a spiral tension-spring located in the aforesaid spindle, a nut also located in the spindle and movable lengthwise thereof, but prevented from turning, and an adjusting-screw, the head of said screw bearing against said tension washer or plate and being exposed through it to admit of adjustment of the tension, substantially as described.

26. The combination of the bobbin-case and the tension-washer and adjustable pressure devices carried by the bobbin-case with a screw-driver or instrument for operating said devices, and means for supporting said screw-driver or instrument, the same being movable into and out of engagement therewith without removal of the bobbin-case from the rotary hook, substantially as described.

27. The combination, with the bobbin-holder of a sewing-machine, of a screw-driver having a collar or projection on its shaft carried by said holder and supported so as to turn freely, and also to have a limited endwise movement, and a retractile spring arranged to bear at one end against said collar or projection on the shaft of said screw-driver, substantially as described.

28. The combination, with the bobbin-holder, bobbin-case, under-thread tension located thereon, and a regulating instrument carried by said holder, of the cloth plate or slide provided with an opening located with reference to said instrument, as set forth, so that the latter may be operated by a finger of the operator inserted through said opening, substantially as described.

29. The combination of the rotary hook, bobbin-case, tension device for the under-thread carried by said case, hinged bobbin-holder provided with a hanger, and an instrument carried by said holder for adjusting the aforesaid tension device, substantially as described.

30. The combination, with a hinged bobbin-holder and a bobbin-hanger located on the face of the holder near the top, of segmental side pieces arranged on opposite sides of the face of the holder for retaining the bobbin-case in position on the holder and guiding it into the hook, substantially as described.

31. The combination of the hinged bobbin-holder provided with a projecting locking-arm with the feed-bar having the arm carrying the feed-surface hollowed out on the arc of a circle concentric with the axis on which the bobbin-holder turns, substantially as described.

32. The combination, in a sewing-machine, with the main shaft turning in bearings in the arm or goose-neck and imparting motion to the needle-bar, of a rotary hook receiving independent motion directly from the main shaft through a shaft and suitable intervening gears, and geared to make two revolutions to each one of said main shaft, substantially as described.

33. The combination of a needle-operating shaft turning in bearing in the goose-neck, a rotary hook-shaft located under the plate and connected with the first-named shaft through the standard of the goose-neck by mechanism for imparting to the hook-shaft twice the speed of revolution of the other, a feed-bar located beneath the plate, an eccentric or feed operating device on the goose-neck or needle-operating shaft, and connections for communicating the required motions to said feed-bar from said eccentric or device, substantially as described.

34. The combination, with a rotary shaft and eccentric mounted thereon, of the feed-rocker hinged to the machine-frame, the feed-bar hinged to the rocker, the slotted bar embracing the eccentric at its upper end and connected at its lower end with an arm of the feed-bar, a pivoted box, and means for adjusting said box in said slotted bar, substantially as described.

35. The combination, with the slotted bar for conveying motion to the feed-bar from the eccentric, of a slide, a box movable in the slot in said bar and pivoted to said slide, a rack and pinion for moving the slide, and a spring for retaining by its pressure the said slide in any position to which it may be adjusted, substantially as described.

36. The combination, with the slotted bar for conveying motion to the feed-bar from the eccentric, the pivoted box, the slide, and the rack and pinion, of a disk connected with the shaft of said pinion and marked with divisions indicating the length of stitch formed by the feed in the different positions of said disk, substantially as described.

37. The combination, with the main shaft turning in bearings in the goose-neck and imparting motion to the needle-bar, of a rotary take-up in the head of the machine, a rotary hook and shaft below the plate connected with and operated from said main shaft, and feed mechanism operated from the main shaft by devices independent of those for operating the rotary hook, substantially as described.

38. A rotary take-up adapted to operate substantially as described, and comprising disks or plates having plain or smooth surfaces opposed or adjacent to each other, and separated by a suitable distance for the free passage of the thread, and one or more pins crossing the space between said disks or plates at the required distance from the center, as set forth.

39. The combination, with the rotary take-up disks or plates having plain or smooth surfaces opposed or adjacent to each other and separated by a suitable distance for the passage of the thread, of two pins located at different distances from the center of rotation, substantially as described.

40. The rotary take-up formed by disks or plates separated by washers with grooved edges and held solidly together by rivets passing through said washers, substantially as described.

41. The combination, with the head of a sewing-machine and a rotary take-up located thereon, and formed of plates or disks, a pin or pins extending between said disks and located near their circumference, of a curved segment secured to the head of the machine over the edges of the disks, and provided with slots or openings for the reception of the thread, substantially as described.

42. The combination of the shaft turning in bearings in the goose-neck, needle-bar, and rotary take-up connected therewith and supported in the head of the machine, and rotary hook-shaft arranged under the plate and geared or connected with the needle-shaft to make two revolutions for each of the latter, substantially as described.

43. The combination, with a reciprocating needle-bar, a rotary hook, a stationary hanger, and bobbin-case suspended in said hook by said hanger, of a take-up acting to take up the needle-loop independently of the rotary hook, so as to complete each stitch separately, and mechanism for connecting and operating said needle-bar, hook, and take-up, substantially as described.

44. The combination of the rotary hook, hanger, and bobbin-case, carrying a tension device, and suspended from the hanger in said hook, as explained, to leave a clear passage between it and the hook, with the feed mechanism, substantially as described, whereby the bobbin-case is lifted by the feed to allow the loop free passage between the hanger and the bobbin-case, as set forth.

45. The combination, with the needle-bar and thread-guide or opening through which the thread is delivered to the needle, of a thread-protector consisting of a rod or grooved wire secured in an upright position on the side of the needle-bar adjacent to the said guide or opening and adapted to operate substantially as described.

46. The combination, with the needle-bar of a sewing-machine, of a thread-protector attached at its lower end to said bar, said protector consisting of an upright rod or wire provided on the outside or side most distant from the needle-bar with a groove, and terminating at the lower end in an inclined tube, substantially as described.

47. The combination, with the needle-bar, eye-pointed needle, take-up arranged to act upon the thread at a point between the spool and the needle and operating devices, of a thread-shield or pivoted finger and mechanism for interposing said shield or finger, as set forth, to ward the thread off the point of the needle as it is drawn through the eye thereof under the action of the take-up, substantially as described.

48. The combination of the rotary hook and shaft carrying the same and located under the plate of the machine, the main shaft located in the goose-neck and geared with the hook-shaft, the feed device or eccentric on the main shaft, feed-bar under the plate, and connecting devices for imparting movement to the feed-surface from the said device or eccentric, the needle-bar, a plain crank on the main shaft connected with the needle-bar through a pitman, and a rotary take-up, substantially as described.

49. The combination of the head, goose-neck or arm, and plate of a sewing-machine with the main shaft turning in bearings in the goose-neck, a plain crank on the main shaft, the needle-bar connected with said crank through a cross-head and pitman, a thread shield or finger pivoted to the head of the machine and operated by a pin on the cross-head moving in a slot in the finger, a rotary take-up fastened to the outside of the aforesaid crank, a feed-eccentric located on the said main shaft, the feed-bar hinged to the feed-rocker, and connected through a slotted bar with said eccentric, the pivoted box and means for adjusting it in the said slotted bar, the rotary hook and shaft placed beneath the plate, and spur-gearing connecting the main shaft with the rotary hook-shaft, so as to revolve the latter at twice its own speed, substantially as described.

In testimony whereof we have signed this specification in the presence of two subscribing witnesses.

CHAS. H. WILLCOX.
JAS. E. A. GIBBS.

Witnesses:
A. POLLOK,
PHILIP MANCE.